Oct. 13, 1970 J. J. TIEMANN 3,534,345

MAGNETIC TRANSDUCER HEAD WITH SHUNT MAGNETIC PATH

Filed March 14, 1968

Inventor:
Jerome J. Tiemann,
by Marvin Snyder
His Attorney.

United States Patent Office 3,534,345

Patented Oct. 13, 1970

3,534,345

MAGNETIC TRANSDUCER HEAD WITH SHUNT MAGNETIC PATH

Jerome J. Tiemann, Schenectady, N.Y., assignor to General Electric Company, a corporation of New York Filed Mar. 14, 1968, Ser. No. 713,096
Int. Cl. G11b *5/02, 5/20, 5/46*
U.S. Cl. 340—174.1 15 Claims

ABSTRACT OF THE DISCLOSURE

A magnetic recording head having read and write magnetic circuits in which remanent magnetization in the read circuit is opposed by remanent magnetization in a shunt magnetic path common to both circuits, resulting in cancellation of residual flux in the vicinity of the nonmagnetic gap in the read circuit. This cancellation occurs when coils on the write magnetic circuit are de-energized following saturation of the shunt path by the magnetic field due to writing current. Loss of sensitivity on readback is avoided by situating read coils between the shunt magnetic path and the nonmagnetic gap in the read magnetic circuit.

INTRODUCTION

This invention relates to magnetic transducer heads, and more particularly to magnetic read and write heads in which remanent fields are substantially eliminated when the write coil is de-energized.

The remanent magnetic field of present-day magnetic transducer heads, which is a consequence of magnetic hysteresis of the transducer head material, is often sufficiently strong to partially erase the magnetic recording medium during readback. To overcome this problem, prior transducer heads have been fabricated from special materials with very low values of remanent magnetization, and with additional nonmagnetic gaps in the magnetic circuit in order to provide demagnetization. Not only have such heads proven expensive to fabricate, due to the more expensive materials employed therein, but additional manufacturing problems have been created by such heads because of the need for additional nonmagnetic gaps in the magnetic circuit. Other attempts to overcome this problem have been made by overlaying material of high magnetic permeability and low coercivity on the pole pieces so as to magnetically short-circuit the residual magnetization in the transducer poles. Again, however, additional material cost is involved, and manufacturing is further complicated by the need for affixing shunt layers of different material to the transducer head during head assembly.

The present invention permits fabrication of magnetic transducer heads without requiring any additional materials other than the usual materials of the head, and without requiring any extra steps in assembly of the head. The invention employs a shunt magnetic path which is saturated by the writing current so that, when the write coil is de-energized, magnetization in the shunt member tends to cancel any residual flux in the vicinity of the read/write gap.

Accordingly, one object of the invention is to provide a simple topological configuration for magnetic recording heads which avoids appreciable remanent magnetic fields at its poles.

Another object is to provide a magnetic recording head including a shunt magnetic path which eliminates residual magnetic flux in the vicinity of the nonmagnetic read/write gap.

Another object is to provide a structural configuration for a magnetic recording head which permits cancellation of magnetic fields at the read/write gap after the write coil has been de-energized.

Briefly, in accordance with a preferred embodiment of the invention, a magnetic transducer head comprising first and second magnetic circuits is provided. Each of the magnetic circuits has individual portions and shares with the other a portion in common. Each of the first and second magnetic circuits contains a nonmagnetic gap in the individual portions. Means are provided for generating an induced voltage in response to a magnetic field in the first magnetic circuit, and additional means are provided for electrically establishing a magnetic field in the second magnetic circuit. The nonmagnetic gap in the first magnetic circuit is situated in close proximity to a magnetic recording medium during both reading and writing operations.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
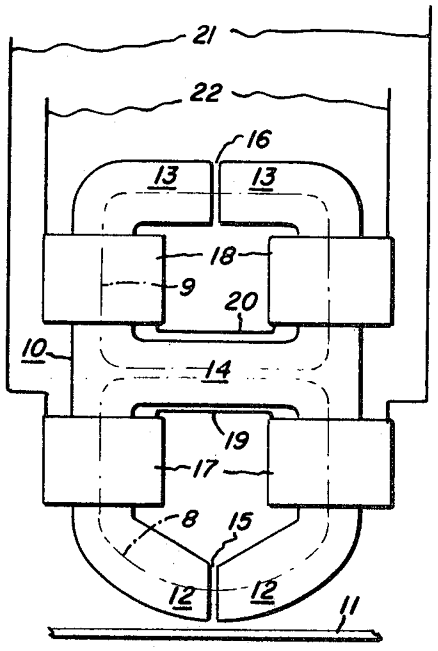
FIG. 1 illustrates the magnetic head of the instant invention, showing location of read and write coils thereon.

In FIG. 1, magnetic recording head 10 is shown in close proximity to a magnetic recording medium 11 which is moved in relation to the head. The head is fabricated in the form of a first magnetic circuit designated generally as a loop 8 and comprising portions 12 and 14 and a second magnetic circuit designated generally as a loop 9 and comprising portions 13 and 14. Thus, the first and second magnetic circuits contain magnetic circuit portion 14 in common. A first nonmagnetic gap 15 having magnetic circuit portions 12 as its poles is situated between portions 12 of first magnetic circuit 8, while a second nonmagnetic gap 16 having magnetic circuit portions 13 as its poles is contained between portions 13 of second magnetic circuit 9. Gap 15 is the well-known read/write gap of the magnetic head, while gap 16 serves to enhance reproducibility performance of the magnetic circuits of the head by raising reluctance of magnetic circuit 9 to a value substantially higher than that contributed by the magnetic materials of the circuit. The head itself may be fabricated of laminations, in which case the material of the head may typically comprise an alloy of 4% molybdenum, 79% nickel and the balance iron, such as Hymu 80, or a nickel-iron alloy such as a Permalloy. Alternatively, the head may be fabricated of unitary construction, in which case the material of the head may comprise a ferrite.

A pair of read coils 17 are wound on individual portions 12, respectively, of first magnetic circuit 8, while a pair of write coils 18 are wound on individual portions 13, respectively, of second magnetic circuit 9. Read coils 17 are joined by a connection 19 and provide output signals on leads 21 as a result of fluctuating magnetic flux paths induced in first magnetic circuit 8 as a result of magnetic fields arising in recording medium 11 and threading portions 12 of the first magnetic circuit as recording medium 10 is moved in relation to head 11. Similarly, write coils 18 are joined by a lead 20 and are energized by input signals furnished through leads 22. The write coils establish a magnetic flux path through second magnetic circuit 9, as well as through an additional magnetic circuit comprising portions 13 of second magnetic circuit 9 and portions 12 of first magnetic circuit 8. Accordingly, coils 17 and 18, respectively, add facility for reading and writing magnetic signals. In both the reading and writing operations, magnetic flux paths thread portions 12 of first magnetic circuit 8 and magnetic recording medium 11 in common.

Figure 2:
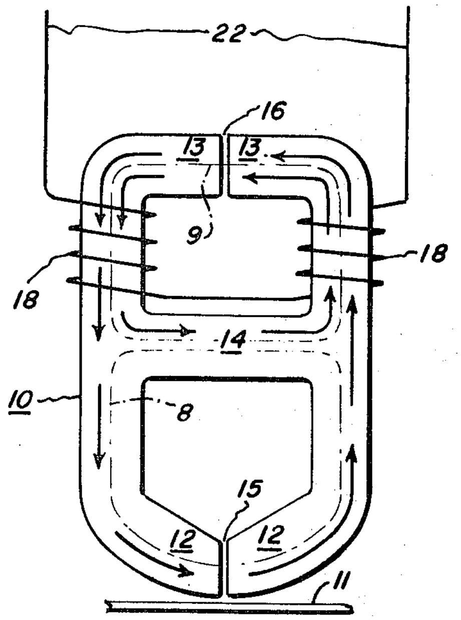
FIGS. 2–4 are schematic illustrations of magnetic flux paths in the head under various conditions of excitation.

In FIG. 2, magnetic flux paths in head 10 occurring during a writing operation are shown, together with a schematic illustration of write windings 18. Since AC signals are supplied to windings 18, the flux paths represented by the arrows are those paths due to instantaneous current flow in one direction through windings 18. Thus, counterclockwise directed flux is induced through the magnetic circuit comprising portions 12 and 13 of magnetic circuits 8 and 9 respectively. Because magnetic heads are typically fabricated of materials of high permeability, such as a Permalloy or a ferrite, in order to maximize magnetic linkage with the recording medium, the problems associated with the magnetic hysteresis characteristics of these materials become significant factors affecting performance of the head. Thus, when a high permeability material is employed in the head, a high residual flux is created in the head because of the hysteresis characteristics of the material. This residual flux manifests itself as a steady magnetic field across read/write gap 15. However, when member 14 is saturated due to flux from windings 18, and windings 18 are thereafter de-energized, there also exists a residual flux in member 14.

Figure 3:
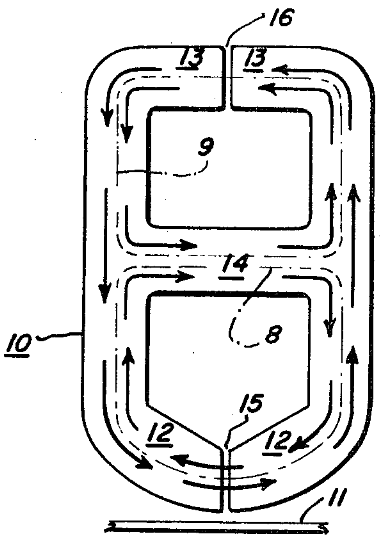

The residual flux in member 14, extant upon deenergization of windings 18, establishes a counterclockwise flux path through magnetic circuit 9 and directs a clockwise flux path through magnetic circuit 8, as illustrated by the arrows in FIG. 3. Accordingly, in magnetic circuit 8, cancellation of residual magnetic flux paths takes place in magnetic circuit portions 12 and across nonmagnetic gap 15. This cancellation is attributable, in part, to presence of gap 16 in magnetic circuit 9 which raises reluctance of the path through magnetic circuit portions 13 to a value sufficiently high in relation to reluctance of the path through magnetic circuit portions 12 as to avoid magnetically short-circuiting portions 12. Accordingly, while residual magnetic flux exists in the vicinity of gap 16, no residual flux remains in the vicinity of gap 15. As a result, if relative motion between magnetic recording medium 11 and head 10 continues, any degradation of recorded signal in medium 11 due to residual magnetic flux paths across gap 15 is eliminated. The residual magnetic flux existing in the vicinity of gap 16 in magnetic circuit 9 is of no significant consequence since, when the write coils are once again energized by input signals, the magnetic fields established in head 10 are of sufficient intensity to overcome the residual flux in that portion of the head.

Figure 4:
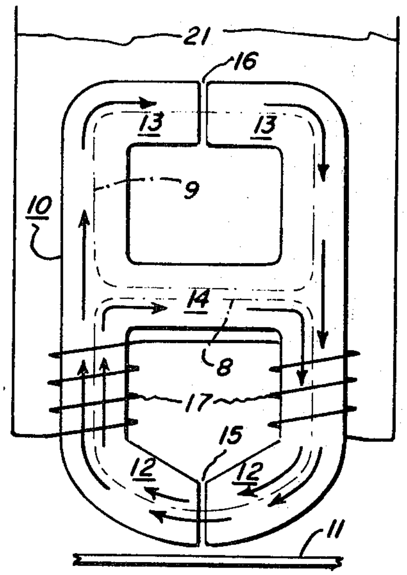

FIG. 4 illustrates the effect on magnetic head 10 due to the field of recording medium 11 as the recording medium and the head move in relation to each other. By situating read coils 17 on members 12 so as to be located between gap 15 and shunt member 14, the read coils are consequently wound about a region of substantially zero residual magnetic flux. Accordingly, there is no accompanying loss of sensitivity in readout operations due to residual flux in head 10. The arrows shown in FIG. 4 indicate instantaneous magnetic flux paths induced in head 10 as a result of the magnetic field arising from medium 11 and the relative motion between the medium and head 10.

The foregoing describes a simple topological configuration for magnetic recording heads which avoids appreciable remanent magnetic fields at its poles. The recording head includes a shunt magnetic path which eliminates residual magnetic flux in the vicinity of the non-magnetic read/write gap. The structural configuration of the head permits cancellation of residual magnetic flux in the vicinity of the read/write gap after the write coil has been de-energized. In a recording system utilizing a separate head to perform each of the functions of recording and readout, the shunt magnetic path of the invention may be employed in the recording or writing head so as to avoid existence of appreciable remanent magnetic fields at the poles of the writing head on either side of the write gap.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A magnetic transducer head comprising: a read magnetic circuit and a write magnetic circuit, each of said magnetic circuits having individual portions and a portion in common, said read magnetic circuit containing a nonmagnetc gap in said individual portions thereof; means for generating an induced voltage in response to magnetic fields in said read magnetic circuit; and means for electrically establishing a magnetic field in said write magnetic circuit and a residual flux in the common portion of said circuits, which flux cancels the residual flux in the vicinity of said nonmagnetic gap.

2. The magnetic transducer head of claim 1 wherein said magnetic circuits are comprised of high magnetic permeability material.

3. The magnetic transducer head of claim 1 wherein said nonmagnetic gap is situated in close proximity to a magnetic recording medium.

4. The magnetic transducer head of claim 1 wherein said means for generating an induced voltage in said read magnetic circuit comprises a coil wound about an individual portion of said read magnetic circuit and said means for electrically establishing a magnetic field in said write magnetic circuit comprises a coil wound about an individual portion of said write magnetic circuit.

5. The magnetic transducer head of claim 4 wherein said magnetic circuits are comprised of high magnetic permeability material.

6. The magnetic head of claim 4 wherein said nonmagnetic gap is situated in close proximity to a magnetic recording medium.

7. A magnetic transducer head comprising: read and write magnetic circuits, said magnetic circuits each having individual portions and a portion in common and each containing a nonmagnetic gap in said individual portions; first winding means coupled to the individual portion of said read magnetic circuit for generating an induced voltage in said first winding means; and second winding means coupled to the individual portion of said write magnetic circuit for establishing a magnetic field in said write magnetic circuit which produces a residual flux in said common portion that tends to cancel the residual flux in the vicinity of the nonmagnetic gap in said read magnetic circuit.

8. The magnetic transducer head of claim 7 wherein the nonmagnetic gap of said read magnetic circuit is situated in close proximity to a magnetic recording medium.

9. The magnetic transducer head of claim 7 wherein said magnetic circuits are comprised of high magnetic permeability material.

10. The magnetic transducer head of claim 9 wherein the nonmagnetic gap of said read magnetic circuit is situated in close proximity to a magnetic recording medium.

11. A magnetic transducer head comprising: a read magnetic circuit and a write magnetic circuit, each of said magnetic circuits having individual portions and a portion in common, said read magnetic circuit containing a nonmagnetic gap in said individual portions thereof, and means for electrically establishing a magnetic field in said write magnetic circuit, said magnetic field producing a residual flux in said portion in common with said magnetic circuits which tends to cancel the residual flux in the vicinity of said nonmagnetic gap.

12. The magnetic transducer head of claim 11 wherein said means for electrically establishing a magnetic field in said second magnetic circuit comprises a coil wound about an individual portion of said second magnetic circuit.

13. The magnetic transducer head of claim 12 wherein said magnetic circuits are comprised of high magnetic permeability material.

14. The magnetic transducer head of claim 13 wherein said nonmagnetic gap is situated in close proximity to a magnetic recording medium.

15. The magnetic transducer head of claim 13 including an additional nonmagnetic gap in the individual portions of said second magnetic circuit.

References Cited

UNITED STATES PATENTS

| | | | |
|---|---|---|---|
| 3,016,427 | 1/1962 | Grant | 179—100.2 |
| 3,048,666 | 8/1962 | Neville | 179—100.2 |
| 3,287,713 | 11/1966 | Porter | 340—174.1 |
| 3,375,332 | 3/1968 | Geyder | 340—174.1 |
| 3,439,355 | 4/1969 | Pear | 340—174.1 |

BERNARD KONICK, Primary Examiner

V. P. CANNEY, Assistant Examiner

U.S. Cl. X.R.

179—100.2